United States Patent
Gyoten et al.

(10) Patent No.: US 7,459,983 B2
(45) Date of Patent: Dec. 2, 2008

(54) TEMPERATURE DETECTING SEMICONDUCTOR DEVICE

(75) Inventors: Takayuki Gyoten, Tokyo (JP); Fukashi Morishita, Tokyo (JP); Katsumi Dosaka, Tokyo (JP)

(73) Assignee: Renesas Technology Corp., Chiyoda-Ku, Tokyo (JP)

( * ) Notice: Subject to any disclaimer, the term of this patent is extended or adjusted under 35 U.S.C. 154(b) by 210 days.

(21) Appl. No.: 11/452,317

(22) Filed: Jun. 14, 2006

(65) Prior Publication Data

US 2006/0285576 A1 Dec. 21, 2006

(30) Foreign Application Priority Data

Jun. 17, 2005 (JP) ............................. 2005-177415
Mar. 7, 2006 (JP) ............................. 2006-060651

(51) Int. Cl.
*G01K 7/00* (2006.01)

(52) U.S. Cl. .......................................... 331/66; 331/57

(58) Field of Classification Search ................... 331/66, 331/69, 70, 176, 179, 57

See application file for complete search history.

(56) References Cited

U.S. PATENT DOCUMENTS 5,994,970 A * 11/1999 Cole et al. ................... 331/68

FOREIGN PATENT DOCUMENTS

| JP | 52146723 | * 12/1977 |
| JP | 58-35431 A | 3/1983 |
| JP | 011305 | * 1/1989 |
| JP | 5-307882 A | 11/1993 |
| JP | 9-223395 A | 8/1997 |
| JP | 10-239097 A | 9/1998 |
| JP | 2000-55742 A | 2/2000 |
| JP | 2000-269417 A | 9/2000 |

* cited by examiner

*Primary Examiner*—David Mis
(74) *Attorney, Agent, or Firm*—Buchanan Ingersoll & Rooney PC

(57) ABSTRACT

There is provided a technique which is capable of detecting a temperature of a semiconductor device with high precision. A temperature detection circuit detecting a temperature of a semiconductor device includes a first short-cycle oscillator generating a first clock signal having positive temperature characteristics with respect to a frequency, a second short-cycle oscillator generating a second clock signal having negative temperature characteristics with respect to the frequency, and a temperature signal generation unit generating a temperature signal which is varied according to the temperature of the semiconductor device based on the first and second clock signals.

4 Claims, 14 Drawing Sheets

F I G . 3
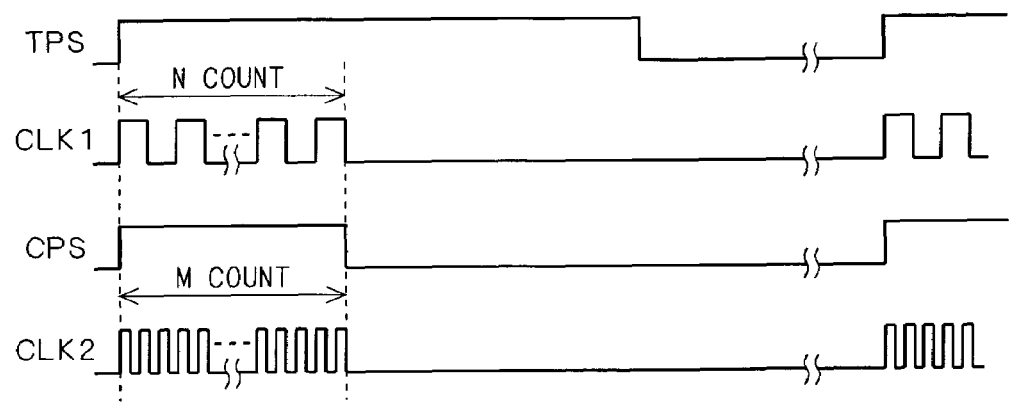
F I G . 4
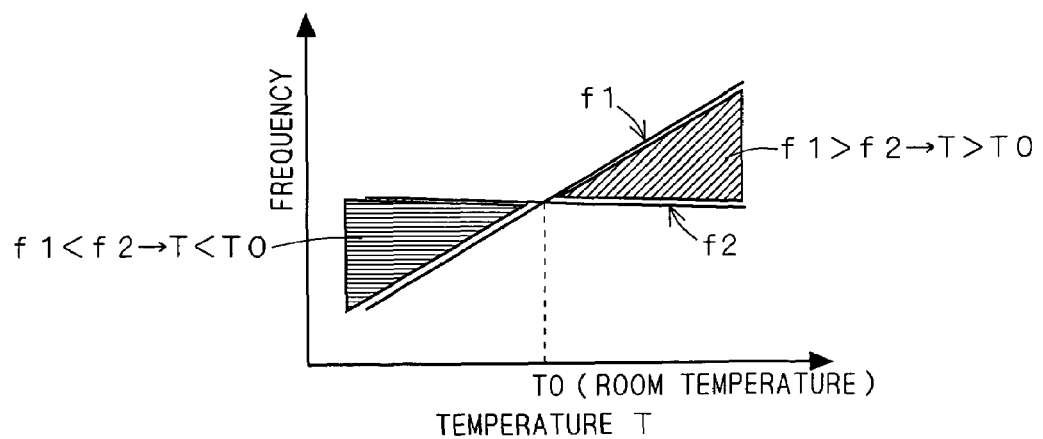

F I G . 7
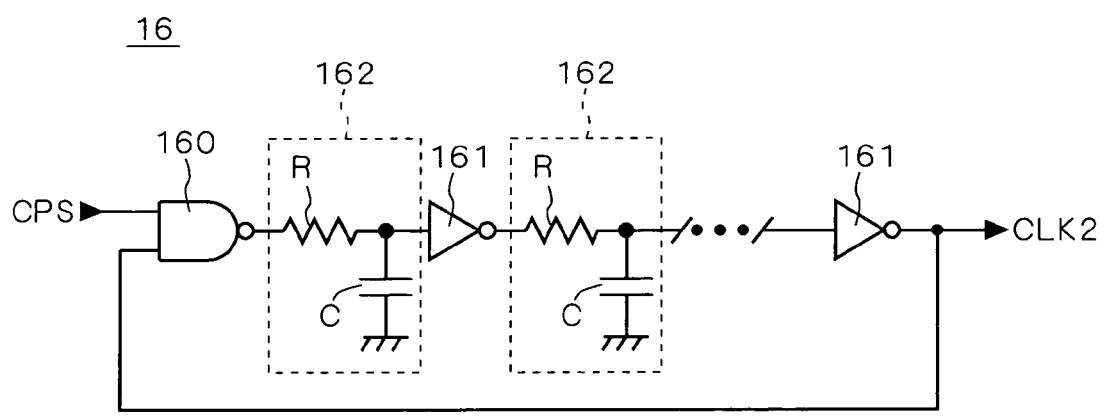

F I G . 1 1
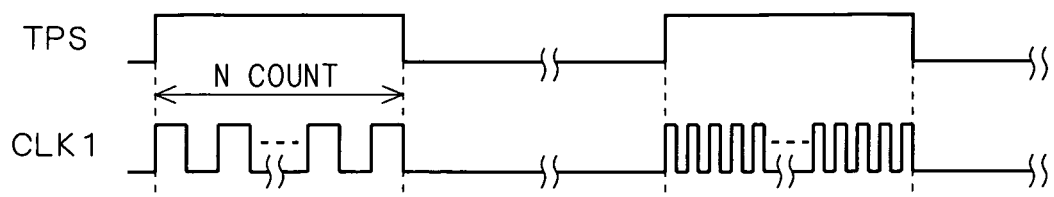
F I G . 1 2
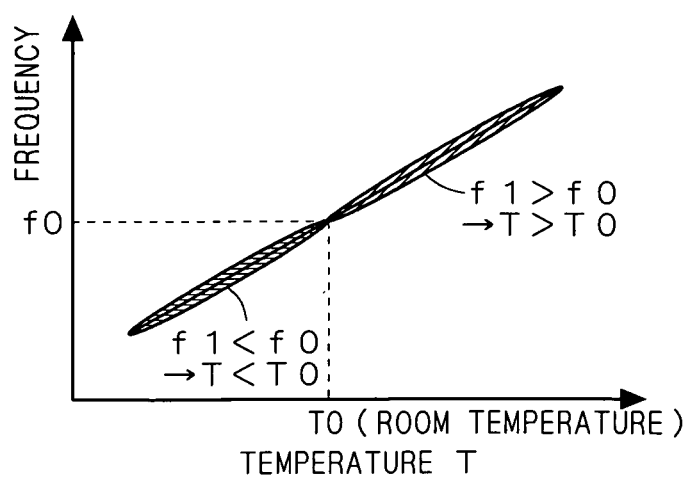

F I G . 1 5
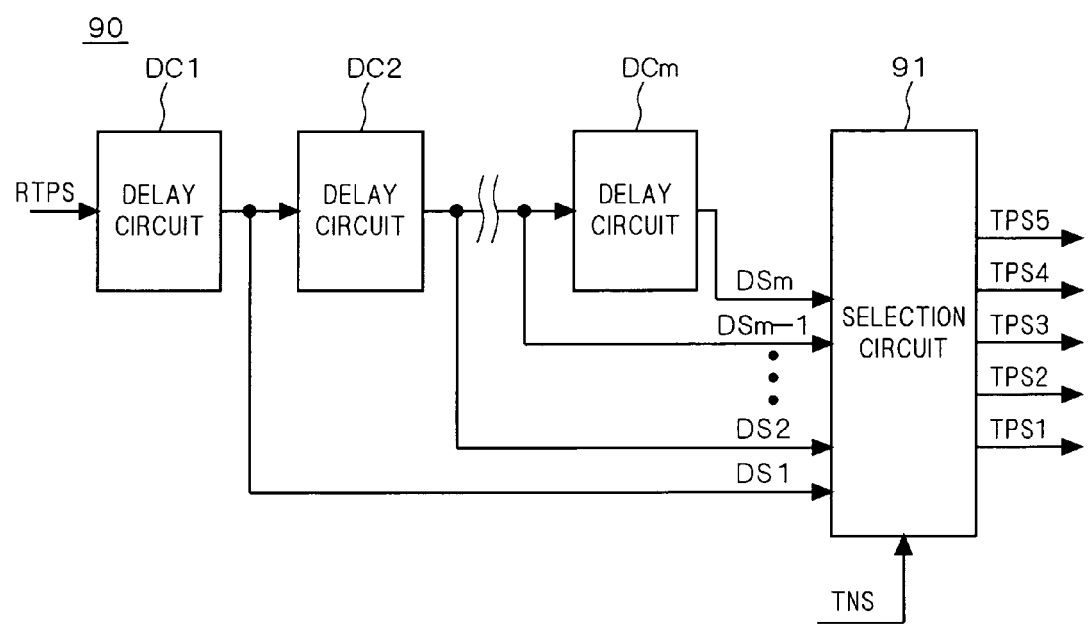

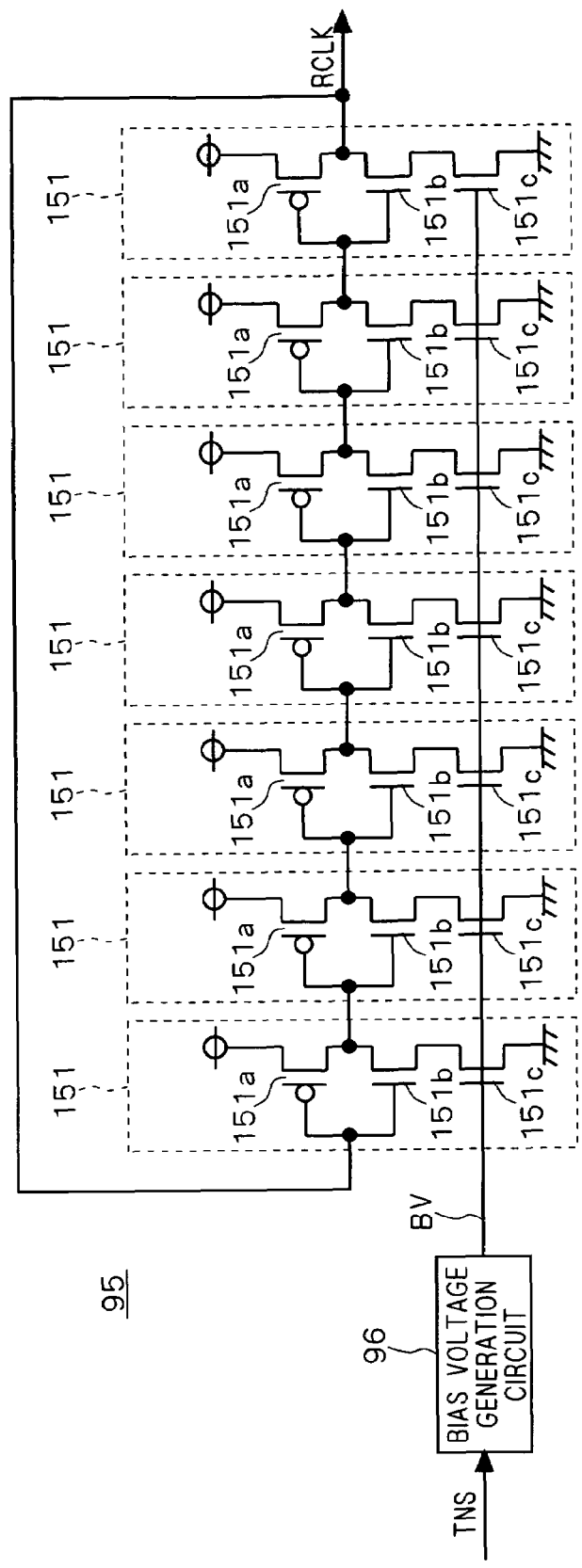

|  | CC1 | CC2 | • • • | CCn |
|---|---|---|---|---|
| CHARACTERISTICS P1 | CV1-1 | CV2-1 | • • • | CVn-1 |
| CHARACTERISTICS P2 | CV1-2 | CV2-2 | • • • | CVn-2 |
| • • • | • • • | • • • | • • • | • • • |
| CHARACTERISTICS Pi | CV1-i | CV2-i | • • • | CVn-i |
| • • • | • • • | • • • | • • • | • • • |
| CHARACTERISTICS Px | CV1-x | CV2-x | • • • | CVn-x |

TEMPERATURE DETECTING SEMICONDUCTOR DEVICE

BACKGROUND OF THE INVENTION

1. Field of the Invention

The present invention relates to a semiconductor device having a temperature detection function.

2. Description of the Background Art

Recently, semiconductor technology is miniaturized in order to implement further high speed and high integration of a semiconductor integrated circuit. Accordingly, an effect that a temperature variation has on device characteristics becomes apparent, and it is necessary to appropriately control the characteristics according to the temperature so that the device may not be erroneously operated by the temperature variation. Thus, it is necessary to correctly detect a temperature of the device, and various kinds of temperature detection circuits have been proposed conventionally. For example, Japanese Patent Application Laid-Open Nos. 2000-55742, 58-35431 (1983), 05-307882 (1993), 09-223395 (1997), 2000-269417 and 10-239097 (1998) disclose a temperature detection circuit which detects a temperature of a semiconductor device based on a variation of a frequency of a clock signal with temperature.

However, sufficient temperature detection precision cannot be provided in the conventional temperature detection circuit, so that an erroneous operation of the device due to a temperature variation could not be completely prevented.

Meanwhile, since the characteristics of the device is varied due to a variation in manufacturing process, when the characteristics of the device is adjusted based on a temperature detection result, it is important to note that they are not affected by the variation in manufacturing process.

SUMMARY OF THE INVENTION

It is a first object of the present invention to provide a technique which is capable of detecting a temperature of a semiconductor device with high precision. In addition, it is a second object of the present invention to provide a technique which is capable of appropriately adjusting device characteristics based on a temperature detection result without being affected by a variation in manufacturing process.

A first semiconductor device according to the present invention includes first and second oscillators and a temperature signal generation circuit. The first oscillator generates a first clock signal having positive temperature characteristics with respect to a frequency. The second oscillator generating a second clock signal having negative temperature characteristics with respect to a frequency. The temperature signal generation unit generates a temperature signal which is varied according to a temperature of the first semiconductor device based on the first and second clock signals.

The temperature signal which is varied according to the temperature of the semiconductor device is generated based on the first clock signal having the positive temperature characteristics with respect to the frequency and the second clock signal having the negative temperature characteristics with respect to the frequency. Therefore, since the temperature signal which is sensitively varied according to the temperature of the semiconductor device is capable of being generated, temperature detection precision is improved.

A second semiconductor device according to the present invention includes a temperature detection circuit detecting a temperature of the second semiconductor device, an object circuit whose electrical characteristics are adjusted, and a tuning circuit adjusting the electrical characteristics of the object circuit based on a detection result in the temperature detection circuit. The tuning circuit includes a memory circuit and a tuning code selection circuit. The memory circuit stores a plurality of tuning codes for adjusting the electrical characteristics of the object circuit, in which memory information is capable of being rewritten. The tuning code selection circuit selects one of the tuning codes based on a detection result in the temperature detection circuit and outputs it to the object circuit.

Since the plurality of tuning codes for adjusting the electrical characteristics of the object circuit are stored in the memory circuit in which the memory information is capable of being rewritten, the tuning codes are capable of being rewritten. Therefore, even when the electrical characteristics of the object circuit are varied due to the variation in manufacturing process, the tuning codes are capable of being rewritten to appropriate values according to the variation. Thus, the electrical characteristics of the object circuit are capable of being appropriately adjusted based on the temperature detection result without being affected by the variation in manufacturing process.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a timing chart showing an operation of a temperature detection circuit according to the first embodiment of the present invention;

FIG. 4 is a view showing temperature characteristics with respect to a frequency of a short-cycle oscillator according to the first embodiment of the present invention;

FIG. 7 is a circuit diagram showing another constitution of the short-cycle oscillator showing negative temperature characteristics according to the first embodiment of the present invention;

FIG. 11 is a timing chart showing an operation of the temperature detection circuit to be compared with the present invention;

FIG. 12 is a view showing a temperature characteristics with respect to a frequency of the short-cycle oscillator in the temperature detection circuit to be compared with the present invention;

FIG. 15 is a block diagram showing a constitution of a timing generation circuit according to a third embodiment of the present invention;

FIG. 16 is a block diagram showing a constitution of a clock signal generation circuit according to a fourth embodiment of the present invention;

DESCRIPTION OF THE PREFERRED EMBODIMENTS

First Embodiment

Figure 1:
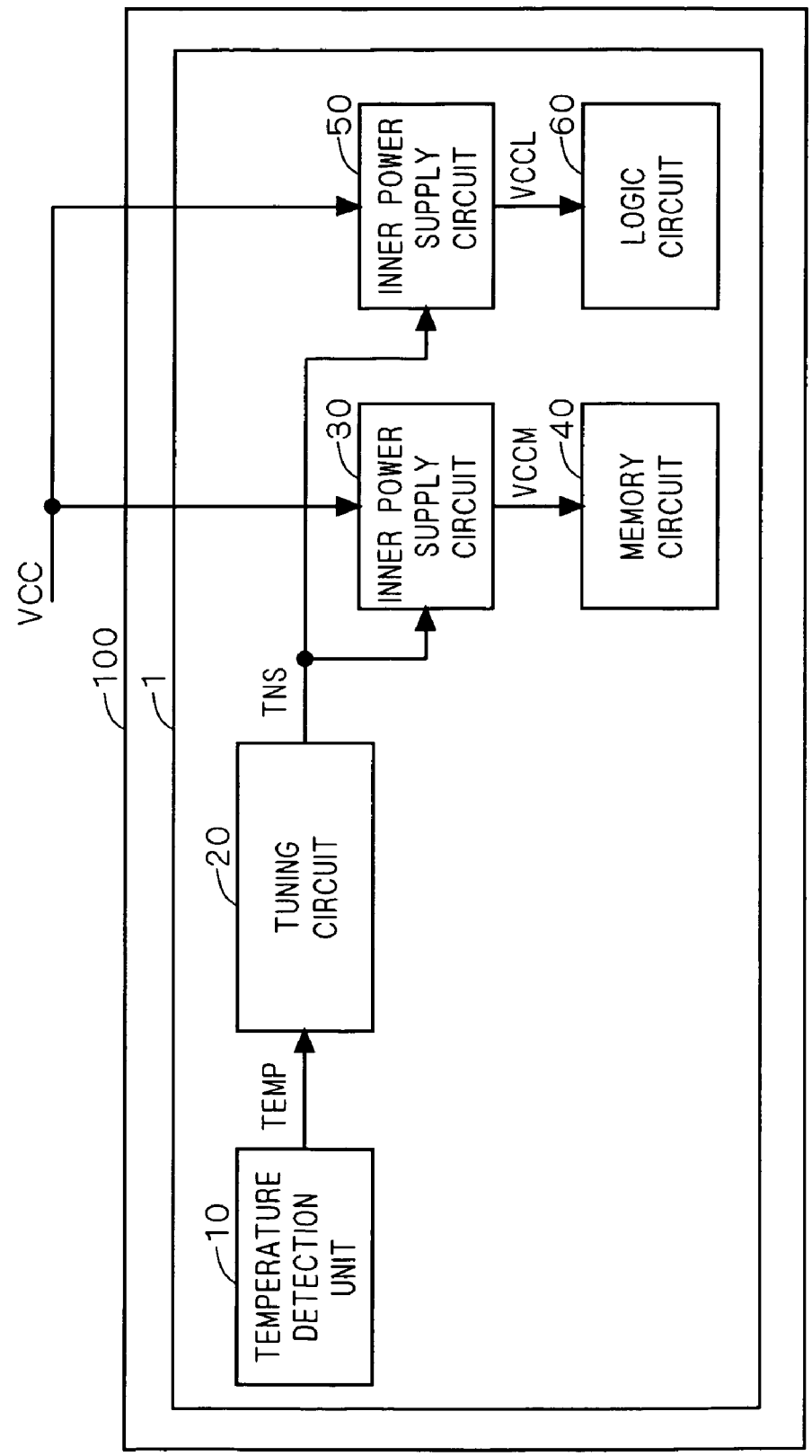
FIG. 1 is a block diagram showing a constitution of a semiconductor device according to a first embodiment of the present invention.

FIG. 1 is a block diagram showing a constitution of a semiconductor device according to a first embodiment of the present invention. As shown in FIG. 1, the semiconductor device according to the first embodiment includes a temperature detection unit 10, a tuning circuit 20, an inner power supply circuits 30 and 50, a memory circuit 40, and a logic circuit 60. These components are formed on a single semiconductor substrate 1 and the semiconductor substrate 1 is housed in a resin package 100.

The temperature detection unit 10 detects a temperature T of the semiconductor device, and outputs its result as a temperature signal TEMP. The tuning circuit 20 generates an adjustment signal TNS based on the temperature signal TEMP outputted from the temperature detection unit 10 and supplies the adjustment signal TNS to the inner power supply circuits 30 and 50 so as to adjust their characteristics.

The inner power supply circuit 30 is a step-down power supply circuit, for example. The inner power supply circuit 30 generates an inner power supply voltage VCCM to be used as a power supply voltage of the memory circuit 40, from an outer power supply voltage VCC inputted from the outside of the resin package 100, and outputs the inner power supply voltage VCCM. The inner power supply circuit 30 is capable of outputting a constant power supply voltage VCCM when the outer power supply voltage VCC is within a predetermined range. Therefore, even when the outer power supply voltage VCC fluctuates to some extent, the inner power supply voltage VCCM is capable of being stably outputted. In addition, the inner power supply circuit 30 outputs the inner power supply voltage VCCM which corresponds to the inputted adjustment signal TNS. Thus, the inner power supply voltage VCCM is automatically adjusted according to the temperature T.

The inner power supply circuit 50 is a step-down power supply circuit similar to the inner power supply circuit 30 and generates an inner power supply voltage VCCL to be used as a power supply voltage of the logic circuit 60 from the outer power supply voltage VCC and outputs it. The inner power supply circuit 50 is capable of outputting a constant power supply voltage VCCL when the outer power supply voltage VCC is within a predetermined range. Therefore, even when the outer power supply voltage VCC fluctuates to some extent, the inner power supply voltage VCCL is capable of being stably outputted. In addition, the inner power supply circuit 50 outputs the inner power supply voltage VCCL which corresponds to the inputted adjustment signal TNS. Thus, the inner power supply voltage VCCL is automatically adjusted according to the temperature T. According to the first embodiment, the inner power supply voltage VCCM and the inner power supply voltage VCCL are set to different voltage values.

The memory circuit 40 is a DRAM (Dynamic Random Access Memory), for example and includes a plurality of memory cells and peripheral circuits (not shown). The memory circuit 40 is operated by the inner power supply voltage VCCM outputted from the inner power supply circuit 30. The logic circuit 60 includes a plurality of logic elements such as an AND circuit and an OR circuit and executes various logical operations. The logic circuit 60 is operated by the inner power supply voltage VCCL outputted from the inner power supply circuit 50.

Figure 2:
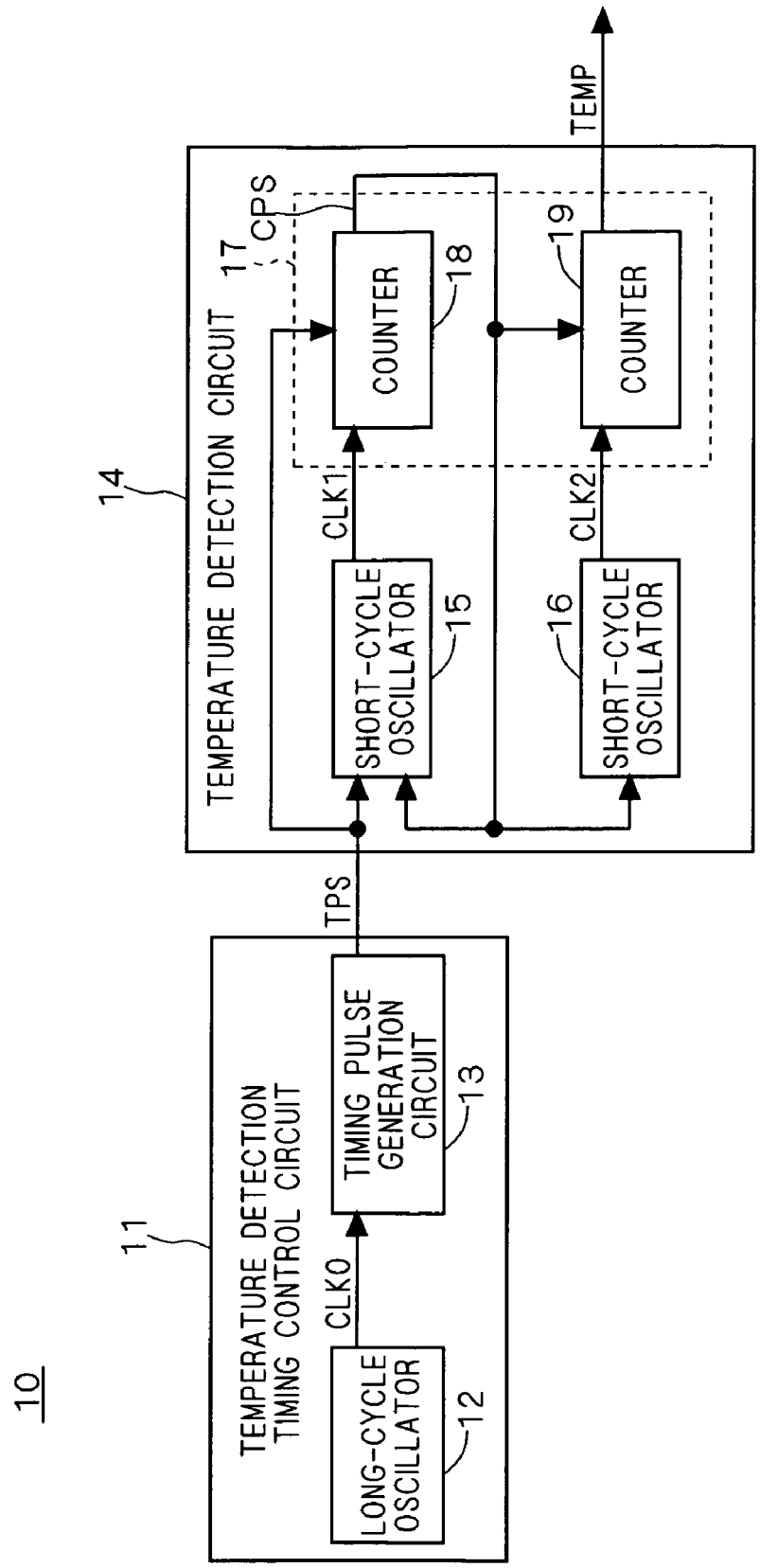
FIG. 2 is a block diagram showing a constitution of a temperature detection unit according to the first embodiment of the present invention.

FIG. 2 is a block diagram showing a constitution of the temperature detection unit 10. As shown in FIG. 2, the temperature detection unit 10 includes a temperature detection timing control circuit 11 and a temperature detection circuit 14. The temperature detection timing control circuit 11 includes a long-cycle oscillator 12 and a timing pulse generation circuit 13 and controls an execution timing of the temperature detection in the temperature detection circuit 14. The long-cycle oscillator 12 outputs a clock signal CLK0 having a cycle of several μsec. Since the clock signal CLK0 has stable temperature characteristics with respect to a frequency, even when the temperature T of the semiconductor device is varied, its frequency is hardly varied.

The timing pulse generation circuit 13 sequentially generates a plurality of timing pulse signals TPS based on the clock signal CLK0 outputted from the long-cycle oscillator 12 and outputs them to the temperature detection circuit 14. The timing pulse generation circuit 13 generates the timing pulse signals TPS having a predetermined pulse width at predetermined intervals and can control the pulse width and the generation intervals of the timing pulse signals TPS.

For example, the timing pulse generation circuit 13 counts the number of pulses of the clock signal CLK0 and when the counted number reaches a first reference value, it changes a Low-level signal to a High-level signal and then the number of pulses of the clock signal CLK0 is newly counted and when the newly counted number reaches a second reference value, the High-level signal is changed to the Low-level signal. Then, the number of pulses of the clock signal CLK0 is newly counted again and when the newly counted number reaches the first reference value, the Low-level signal is changed to the High-level signal again. Thus, the timing pulse signals TPS having the predetermined width are capable of being generated at predetermined intervals by counting the number of pulses of the clock signal CLK0, and the pulse width and the generation intervals of the timing pulse signals TPS are capable of being individually controlled by varying the first and second reference values to be compared with the counted number individually. In addition, the timing pulse generation circuit 13 determines the first and second reference values according to an instruction from a CPU (not shown) provided in the semiconductor device.

The temperature detection circuit 14 includes a short-cycle oscillators 15 and 16 and a temperature signal generation circuit 17, and generates a temperature signal TEMP every time the timing pulse signal TPS is inputted and outputs it to the tuning circuit 20. The short-cycle oscillator 15 generates a clock signal CLK1 having a positive temperature characteristics with respect to the frequency. Therefore, a frequency f1 of the clock signal CLK1 increases as the temperature T of the semiconductor device rises and decreases as the temperature T falls. Meanwhile, the short-cycle oscillator 16 generates a clock signal CLK2 having a negative temperature characteristics with respect to the frequency. Therefore, a frequency f2 of the clock signal CLK2 decreases as the temperature T of the semiconductor device rises and increases as the temperature T falls. In addition, the cycles of the clock signals CLK1 and CLK2 are set sufficiently smaller than the that of the clock signal CLK0.

The temperature signal generation circuit 17 includes counters 18 and 19 and generates a temperature signal TEMP which is varied according to the temperature T of the semiconductor device, based on the clock signals CLK1 and CLK2. The counter 18 counts the number of pulses of the clock signal CLK1 by a predetermined number N and outputs a count period signal CPS which is activated during the counting period. The counter 19 counts the number of pulses of the clock signal CLK2 while the count period signal CPS is activated and outputs a signal showing the counted number M to the tuning circuit 20 as the temperature signal TEMP.

FIG. 3 is a timing chart showing an operation of the temperature detection circuit 14. As shown in FIG. 3, when the timing pulse signal TPS rises, the short-cycle oscillator 15 and the counter 18 are activated. Then, the short-cycle oscillator 15 oscillates and outputs the clock signal CLK1 and the counter 18 counts the number of pulses of the clock signal CLK1 by the number N and outputs a pulse signal which becomes High level while the number is counted as the count period signal CPS. When the count period signal CPS falls, the short-cycle oscillator 15 and the counter 18 stops their operation. Then, when the timing pulse signal TPS rises again, the short-cycle oscillator 15 and the counter 18 are activated and the same operation as the above is repeated.

The short-cycle oscillator 16 and the counter 19 are activated when the count period signal CPS rises, and the short-cycle oscillator 16 oscillates and outputs the clock signal CLK2 and the counter 19 counts the number of pulses of the clock signal CLK2 while the count period signal CPS is at High level and outputs a signal showing the counted number M as the temperature signal TEMP. The short-cycle oscillator 15 and the counter 18 stop their operation when the count period signal CPS falls and then when the count period signal CPS rises again, the same operation as the above is executed.

As described above, according to the temperature detection circuit 14 in the first embodiment, while the number of pulses of the clock signal CLK1 is counted to the number N, the number of pulses of the clock signal CLK2 is counted to the number M. Therefore, when N=M, the frequencies f1 and f2 of the clock signals CLK1 and CLK2 are such that f1=f2 and when N>M, they are such that f1>f2 and when N<M, they are such that f1<f2.

FIG. 4 is a view showing a relation between the temperature T of the semiconductor device and the frequencies f1 and f2 of the clock signals CLK1 and CLK2. According to the first embodiment, the frequencies f1 and f2 of the clock signals CLK1 and CLK2 when the temperature T is a room temperature T0 are set to the same value. As shown in FIG. 4, when the temperature T rises, the frequency f1 showing the positive temperature characteristics increases and the frequency f2 showing the negative temperature characteristics decreases. Thus, when the temperature T becomes higher than the room temperature T0, the frequency f1 becomes higher than the frequency f2 and a difference between them increases as the temperature T becomes high.

Meanwhile, when the temperature T falls, the frequency f1 showing the positive temperature characteristics decreases and the frequency f2 showing the negative temperature characteristics increases. Thus, when the temperature T becomes lower than the room temperature T0, the frequency f1 becomes lower than the frequency f2 and a difference between them increases as the temperature T becomes low.

Thus, when T>T0, f1>f2, so that when T>T0, N>M. Meanwhile, when T<T0, f1<f2, so that when T<T0, N<M. According to the first embodiment, since the value N is a constant value and it is not changed, the value of the present temperature T can be found by previously finding the relation between the temperature T and the counted number M through simulation and the like and referring the temperature signal TEMP showing the counted number M.

Figure 5:
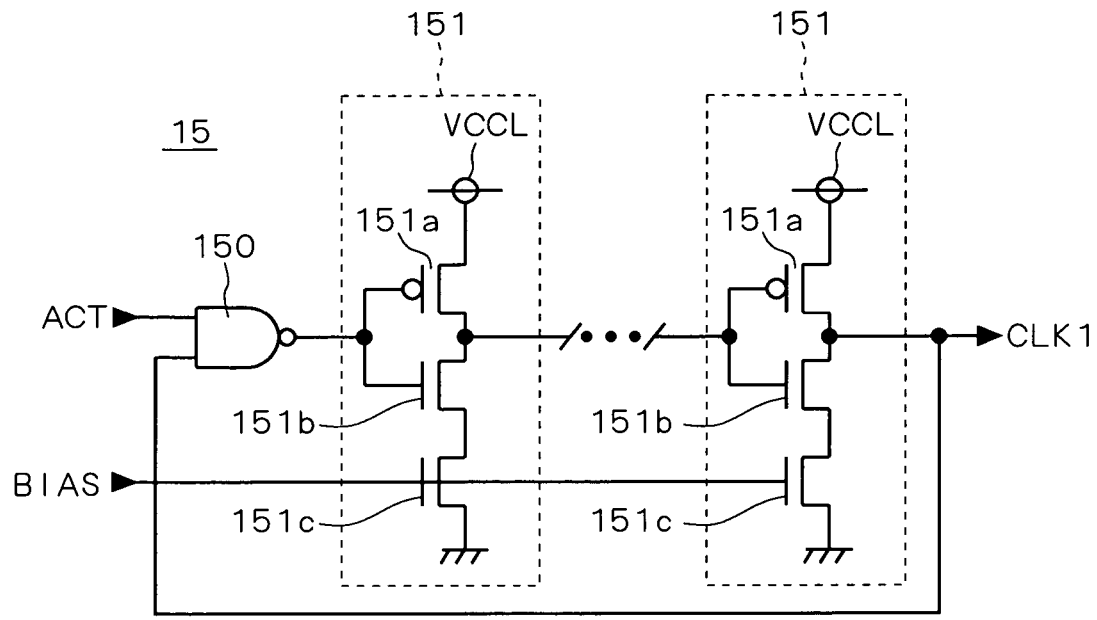
FIG. 5 is a circuit diagram showing a constitution of the short-cycle oscillator showing positive temperature characteristics according to the first embodiment of the present invention.

Next, a circuit constitution example of the short-cycle oscillator 15 having the positive temperature characteristics will be described. FIG. 5 is a circuit diagram showing one example of a constitution of the short-cycle oscillator 15. The short-cycle oscillator 15 shown in FIG. 5 is a current control type of oscillator which is operated by the inner power supply voltage VCCL and includes a NAND circuit 150 and plural stages of inversion circuits 151. Each of the inversion circuits 151 includes a PMOS transistor 151a and NMOS transistors 151b and 151c. The inner power supply voltage VCCL is applied to a source of the PMOS transistor 151a and a drain of the NMOS transistor 151b is connected to a drain of the PMOS transistor 151a. A drain of the NMOS transistor 151c is connected to a source of the NMOS transistor 151b, and a ground voltage is applied to a source of the NMOS transistor 151c. Thus, a gate of the PMOS transistor 151a and a gate of the NMOS transistor 151b are connected to each other.

In each of the inversion circuits 151 except for the last stage of circuit 151, a connection point between the drain of the PMOS transistor 151a and the drain of the NMOS transistor 151b is connected to a connection point between a gate of the PMOS transistor 151a and a gate of the NMOS transistor 151b in the next inversion circuit 151. In the last inversion circuit 151, a signal at the connection point between a drain of the PMOS transistor 151a and a drain of the NMOS transistor 151b is outputted as the clock signal CLK1 and the connection point is connected to one input of the NAND circuit 150.

An activation signal ACT is inputted to the other input of the NAND circuit 150 and an output of the NAND circuit 150 is connected to a connection point between the gate of the PMOS transistor 151a and the gate of the NMOS transistor 151b in the first stage of inversion circuit 151. A bias voltage BIAS is inputted to each of the gates of the NMOS transistor 151c in the plural stages of inversion circuits 151.

According to the circuit shown in FIG. 5, when the activation signal ACT is shifted from Low level to High level, oscillation of the clock signal CLK1 is started and when it is shifted from High level to Low level, the oscillation of the clock signal CLK1 is stopped. Therefore, the short-cycle oscillator 15 which performs the above operation can be provided by adding a circuit which generates a signal which becomes High level when the timing pulse signal TPS becomes High level, and becomes Low level when the count period signal CPS becomes Low level, to the constitution in FIG. 5, and inputting that signal to the NAND circuit 150 as the activation signal ACT.

In addition, when the bias voltage BIAS is varied, since an output current of the inversion circuit 151 is varied, the temperature characteristics of the short-cycle oscillator 15 can be adjusted by the bias voltage BIAS. Therefore, the short-cycle oscillator 15 having the positive temperature characteristics shown in FIG. 4 can be implemented by appropriately setting the bias voltage BIAS.

Figure 6:
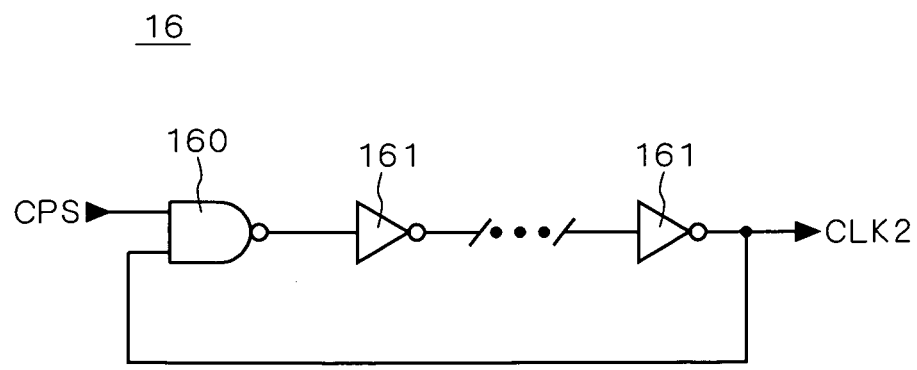
FIG. 6 is a circuit diagram showing a constitution of the short-cycle oscillator showing negative temperature characteristics according to the first embodiment of the present invention.

Next, a circuit constitution example of the short-cycle oscillator 16 having the negative temperature characteristics will be described. FIG. 6 is a circuit diagram showing one example of the constitution of the short-cycle oscillator 16, and FIG. 7 is a circuit diagram showing another constitution of the short-cycle oscillator 16. The short-cycle oscillator 16 shown in FIG. 6 is an inverter type of oscillator which is operated by the inner power supply voltage VCCL, and includes a NAND circuit 160 and plural stages of CMOS inverter circuits 161. The count period signal CPS is inputted to one input of the NAND circuit 160 and an output of the last stage of CMOS inverter circuit 161 is connected to the other input thereof. An output of the NAND circuit 160 is connected to an input of the first stage of CMOS inverter circuit 161. In the plural stages of CMOS inverter circuits 161 except for the last stage thereof, respective outputs are connected to inputs of the next CMOS inverter circuit 161. An output signal of the last stage of CMOS inverter circuit 161 is outputted to the counter 19 as the clock signal CLK2.

According to the short-cycle oscillator 16 shown in FIG. 7, a plurality of RC delay circuits 162 are added to the circuit constitution shown in FIG. 6. The plurality of RC delay circuits 162 correspond to the plurality of CMOS inverter circuits 161 one on one, and they are provided at the input stage of the corresponding CMOS inverter circuit 161. The RC delay circuit 162 includes a resistor element R and a capacitor element C. One end of the capacitor element C is connected to one end of the resistor element R and an input of the corresponding CMOS inverter circuit 161, and the ground voltage is applied to the other end of the capacitor C. Furthermore, the other end of the resistor element R is connected to an output of the previous element.

In the short-cycle oscillator 16 shown in FIG. 6 or 7, when the count period signal CPS is shifted from Low level to High level, oscillation of the clock signal CLK2 is started and when it is shifted from High level to Low level, the oscillation of the clock signal CLK2 is stopped.

In addition, as shown in FIG. 4, according to the frequency f2 of the short-cycle oscillator 16 shown in FIG. 6 or 7, an absolute value of variation with respect to the temperature T is small as compared with the frequency f1 of the short-cycle oscillator 15 shown in FIG. 5. That is, the frequency f2 of the short-cycle oscillator 16 shown in FIG. 6 or 7 is not varied so much by the temperature T as the frequency f1 of the short-cycle oscillator 15 shown in FIG. 5. In addition, according to the short-cycle oscillator 16 shown in FIG. 7, its temperature characteristics can be adjusted in some degree by varying the value of the resistor element R or the capacitor element C of the RC delay circuit 162.

Figure 8:
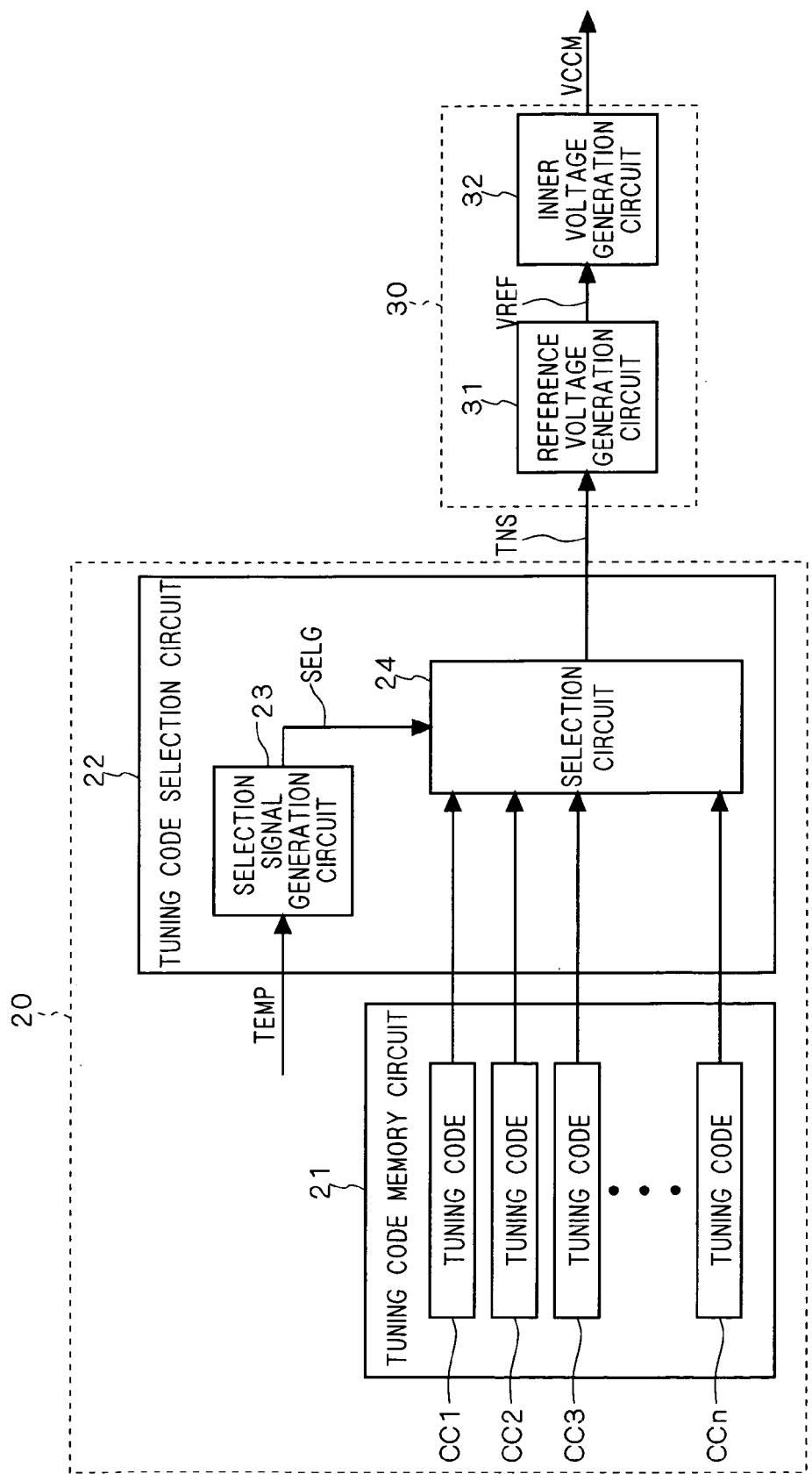
FIG. 8 is a block diagram showing constitutions of a tuning circuit and an inner power supply circuit according to the first embodiment of the present invention.

FIG. 8 is a block diagram showing constitutions of the tuning circuit 20 and the inner power supply circuit 30. In addition, since a constitution of the inner power supply circuit 50 is the same as that of the inner power supply circuit 30, its description will be omitted. As shown in FIG. 8, the tuning circuit 20 includes a tuning code memory circuit 21 in which n($\geq$2) tuning codes CC1 to CCn are stored, and a tuning code selection circuit 22 which selects one code from the plurality of tuning codes CC1 to CCn according to the temperature signal TEMP outputted from the temperature detection unit 10 and outputs it.

The tuning code memory circuit 21 is a register circuit configured by a plurality of flip flops or a fuse circuit using a metal fuse or an electric fuse, for example, and its memory information is capable of being rewritten by the above-described CPU (not shown). Thus, the tuning code memory circuit 21 outputs all of the stored plurality of tuning codes CC1 to CCn to the tuning code selection circuit 22.

The tuning code selection circuit 22 includes a selection signal generation circuit 23 generating a selection signal group SELG which is varied according to the temperature signal TEMP, and a selection circuit 24 selecting one code from the plurality of tuning codes CC1 to CCn based on the selection signal group SELG generated in the selection signal generation circuit 23 and outputs it as the adjustment signal TNS.

According to the first embodiment, a range of the values of the temperature signal TEMP, that is, a range of the counted values of the counter 19 is presorted to n sections whose number is the same as that of the tuning codes CC1 to CCn, and the selection signal generation circuit 23 determines which section the inputted temperature signal TEMP belongs to. The selection signal group SELG includes n selection signals SEL<0> to SEL<n-1>, and these selection signals SEL<0> to SEL<n-1> correspond to the above n sections one on one. The selection signal generation circuit 23 sets the value of the signal corresponding to the section the received temperature signal TEMP belongs to, to "1" among the selection signals SEL<0> to SEL<n-1> and outputs the selection signal group SELG to the selection circuit 24.

Figure 9:
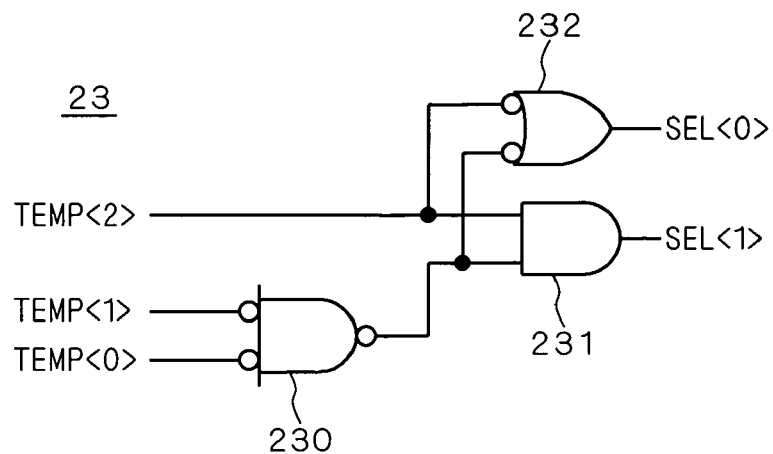
FIG. 9 is a circuit diagram showing a constitution of a selection circuit in the tuning circuit according to the first embodiment of the present invention.

For example, when it is assumed that the counter 19 is a three-bit counter and the temperature signal TEMP includes 3-bit data TEMP<2:0>, the value of the temperature signal TEMP ranges from "000" to "111" ("0" to "7" in decimal form). This range is divided into a range from "000" to "100" (referred to as the "section A" hereinafter) and a range from "101" to "101" (referred to as the "section B" hereinafter), for example and the selection signal SEL<0> corresponds to the section A and the selection signal SEL<1> corresponds to the section B of the two selection signals SEL<0> and SEL<1> of the selection signal group SELG, for example. In this case, when the value of the received temperature signal TEMP is "010" and belongs to the section A, the selection signal generation circuit 23 outputs a selection signal group SELG in which the selection signal SEL<0> designates "1" and the selection signal SEL<1> designates "0". FIG. 9 is a circuit diagram showing a constitution of the selection signal generation circuit 23 in this case.

The selection signal generation circuit 23 shown in FIG. 9 includes a NAND circuit 230, an AND circuit 231 and an OR circuit 232. The NAND circuit 230 calculates negative AND between an inverted value of the data TEMP<0> and an inverted value of the data TEMP<1> and outputs it to the AND circuit 231. The AND circuit 231 calculates logical AND between the output of the NAND circuit 230 and the data TEMP<2> and outputs it as the selection signal SEL<1>. The OR circuit 232 calculates logical OR between an inverted value of the output of the NAND circuit 230 and an inverted value of the data TEMP<2> and outputs it as the selection signal SEL<0>.

According to the selection signal generation circuit 23 having the above circuit constitution, when the data TEMP<2:0> ranges from "000" to "100", the selection signal SEL<1>=0 and the selection signal SEL<0>=1, and when the data TEMP<2:0> ranges from "101" to "111", the selection signal SEL<1>=1 and the selection signal SEL<0>=0.

The plurality of tuning codes CC1 to CCn stored in the tuning code memory circuit 21 correspond to the n selection signals SEL<0> to SEL<n-1> of the selection signal group SELG one on one. The selection circuit 24 selects the code corresponding to the signal designating "1" among the selection signals SEL<0> to SEL<n-1> from the plurality of tuning codes CC1 to CCn and outputs it as the adjustment signal TNS.

The inner power supply circuit 30 includes a reference voltage generation circuit 31 generating a reference voltage VREF and outputting it and an inner voltage generation circuit 32 generating an inner power supply voltage VCCM from the reference voltage VREF and outputting it. The reference voltage generation circuit 31 can vary a value of the reference voltage VREF to n kinds and the n kinds of voltage values correspond to the n tuning codes CC1 to CCn one on one. The reference voltage generation circuit 31 outputs the reference voltage VREF showing the voltage value corresponding to the tuning code designated by the inputted adjustment signal TNS.

The inner voltage generation circuit 32 generates the inner power supply voltage VCCM, for example, having the same value as that of the reference voltage VREF and outputs it. Therefore, when the reference voltage VREF is varied according to the adjustment signal TNS, the inner power supply voltage VCCM is also varied. Here, the adjustment signal TNS is varied according to the temperature signal TEMP as can be understood from the above description. Therefore, the inner power supply voltage VCCM is also varied according to the temperature signal TEMP. Thus, the value of the inner power supply voltage VCCM is appropriately adjusted according to the temperature T of the semiconductor device. In addition, the reference voltage VREF may be supplied to a circuit (not shown) other than the inner voltage generation circuit 32.

As described above, the temperature detection circuit 14 according to the first embodiment generates the temperature signal TEMP which is varied according to the temperature T of the semiconductor device of the present invention based on the clock signal CLK1 having the positive temperature characteristics with respect to the frequency and the clock signal CLK2 having the negative temperature characteristics with respect to the frequency. Therefore, since the temperature signal TEMP which is sensitively varied according to the temperature T of the semiconductor device is capable of being generated, temperature detection precision is improved. This effect will be described in detail hereinafter.

Figure 10:
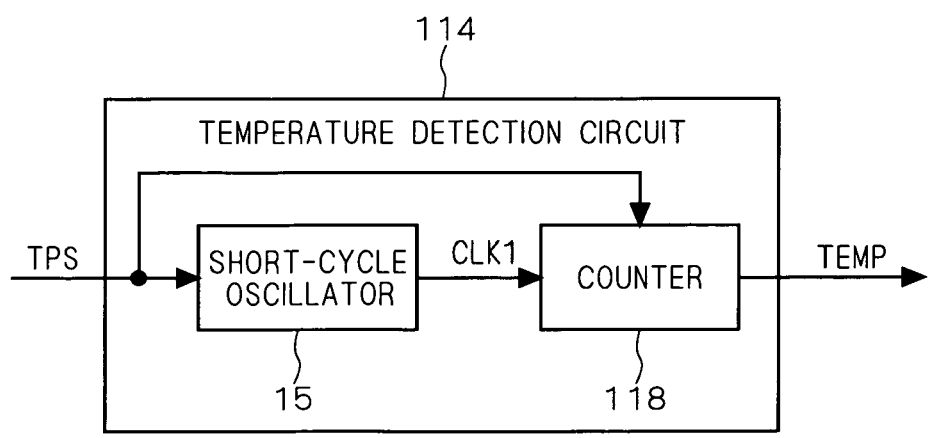
FIG. 10 is a block diagram showing a constitution of a temperature detection circuit to be compared with the present invention.

FIG. 10 is a block diagram showing a constitution of a temperature detection circuit 114 to be compared with the temperature detection circuit 14 according to the first embodiment. The temperature detection circuit 114 shown in FIG. 10 is different from the temperature detection circuit 14 in that it generates a temperature signal TEMP only using the clock signal CLK1 having the positive temperature characteristics.

As shown in FIG. 10, the temperature detection circuit 114 includes the above-described short-cycle oscillator 15 and a counter 118. The counter 118 counts the number of pulses of the clock signal CLK1 while a timing pulse signal TPS is activated and outputs a signal showing the counted number N as the temperature signal TEMP.

FIG. 11 is a timing chart showing an operation of the temperature detection circuit 114. As shown in FIG. 11, when the timing pulse signal TPS rises, the short-cycle oscillator 15 and the counter 118 are activated. Then, the short-cycle oscillator 15 oscillates and outputs the clock signal CLK1, and the counter 118 starts to count the number of pulses of the clock signal CLK1. Then, when the timing pulse signal TPS falls, the short-cycle oscillator 15 stops its operation and the counter 118 stops counting the number of pulses and outputs the counted number N at that time as the temperature signal TEMP. Then, when the timing pulse signal TPS rises again, the same operation as the above is repeated.

FIG. 12 is a view showing a relation between a temperature T and a frequency f1 of the clock signal CLK1 in the case where the temperature detection circuit 114 is incorporated instead of the temperature detection circuit 14 in the semiconductor device according to the first embodiment. As shown in FIG. 12, when it is assumed that the frequency f1 of the clock signal CLK1 is f0 when the temperature T is a room temperature T0, in a case where the temperature T becomes higher than the room temperature T0, the frequency f1 showing the positive temperature characteristics becomes higher than the f0. Meanwhile, in a case where the temperature T becomes lower than the room temperature T0, the frequency f1 becomes lower than the f0.

Thus, when T>T0, the frequencies are such that f1>f0, so that when it is assumed that the counted number N of the counter 118 when T=T0 is N0, the numbers are such that N>N0 when T>T0. Meanwhile, when T<T0, the frequencies are such that f1<f0, so that the numbers are such that N<N0 when T<T0. Therefore, the value of the present temperature T can be found by previously finding the relation between the temperature T and the counted number N through simulation and the like and referring the temperature signal TEMP.

As described above, the temperature T can be detected only by using the clock signal CLK1. However, even when the temperature T is varied, since the frequency is hardly varied while the timing pulse signal TPS is at High level, only the counted number N of the counter 118 is varied according to the temperature T. That is, the temperature signal TEMP is varied only depending on the temperature characteristics of the clock signal CLK1.

Meanwhile, according to the temperature detection circuit 14 in the first embodiment, since the count period signal CPS is generated based on the clock signal CLK1 having the positive temperature characteristics, the pulse width of the count period signal CPS is varied according to the temperature T. Thus, when the temperature T is varied, the frequency of the clock signal CLK2 is varied in the direction opposite to the direction in which the pulse width of the count period signal CPS is varied. Therefore, the counted number M of the counter 19, that is, the value of the temperature signal TEMP becomes small as the temperature T becomes high and then the pulse width of the count period signal CPS is shortened, and becomes small as the frequency of the clock signal CLK2 becomes low. Meanwhile, as the temperature T becomes low, the value of the temperature signal TEMP becomes great because the pulse width of the count period signal CPS is elongated and becomes great because the frequency of the clock signal CLK2 becomes high.

Thus, according to the temperature detection circuit 14 in the first embodiment, since the temperature signal TEMP is varied depending on both clock signals CLK1 and CLK2, the temperature signal TEMP is sensitively varied with respect to the temperature T. As a result, the temperature detection precision is improved.

In addition, according to the first embodiment, since the electric characteristics of the circuit to be adjusted such as the inner power supply circuit 30 or 50 are adjusted based on the temperature signal TEMP which can be sensitively varied with respect to the temperature T, the characteristics can be adjusted with respect to the temperature variation with high precision. As a result, an erroneous operation of the semiconductor device of the present invention can be surely prevented.

In addition, according to the temperature detection unit 10 in the first embodiment, the temperature detection timing control circuit 11 can control generation intervals of the plurality of timing pulse signals TPS, and the temperature detection circuit 14 generates the temperature signal TEMP every time one of the plurality of timing pulse signals TPS is inputted. Therefore, an execution timing of the temperature detection in the temperature detection circuit 14 can be controlled by controlling the generation intervals of the plurality of timing pulse signals TPS. Thus, an optimal temperature detection execution timing corresponding to a system in which the semiconductor device of the present invention is used can be set.

For example, when the semiconductor device of the present invention is used in a system requiring low power consumption, the generation interval of the timing pulse signal TPS is elongated and the interval in which the temperature is detected is elongated to lower the power consumption of the semiconductor device of the present invention. Meanwhile, when the semiconductor device of the present invention is used in a system which takes top priority to a safety operation, the generation interval of the timing pulse signal TPS is shortened so that the temperature is frequently detected. As a result, the temperature detection precision is improved and the erroneous operation of the semiconductor device of the present invention can be prevented.

In addition, according to the first embodiment, since the tuning codes CC1 to CCn can be rewritten, even when the value is changed after set, the optimal tuning codes CC1 to CCn can be set. For example, when the simulation result is different from an experiment result, the values of the tuning codes CC1 to CCn set based on the simulation result can be reset based on the experiment result.

In addition, the tuning code memory circuit 21 may be a RAM (Random Access Memory) having a plurality of memory cells. In this case, the selection circuit 24 outputs an address signal or a control signal to the tuning code memory circuit 21 based on the selection signal group SELG, and selects and reads out one of the plurality of tuning codes CC1 to CCn from the tuning code memory circuit 21.

In addition, when the values of the tuning codes CC1 to CCn are previously adjusted in the manufacturing process of the semiconductor device of the present invention, variation in characteristics of the memory circuit 40 or the logic circuit 60 caused by a variation in manufacturing process can be absorbed. For example, variations in characteristics of the elements in the memory circuit 40 and the logic circuit 60 are confirmed at the time of wafer test of the semiconductor device of the present invention, and the values of the tuning codes CC1 to CCn are set greater or smaller than the design values as a whole according to the confirmed variations. Thus, the values of the inner power supply voltages VCCL and VCCM are adjusted according to the variation in manufacturing process, so that the variation in characteristics of the memory circuit 40 which is operated by the inner power supply voltage VCCM and the variation in characteristics of the logic circuit 60 which is operated by the inner power supply voltage VCCL can be absorbed.

Second Embodiment

Although the number of pulses of the clock signal CLK2 counted while the clock signal CLK1 is counted by N is outputted as the temperature signal TEMP in the semiconductor device according to the first embodiment, the number of pulses of the clock signals CLK1 and CLK2 may be counted for a predetermined period of time and a difference between the counted numbers may be outputted as the temperature signal TEMP. A description will be made of a detection circuit of a temperature T in this case hereinafter.

Figure 13:
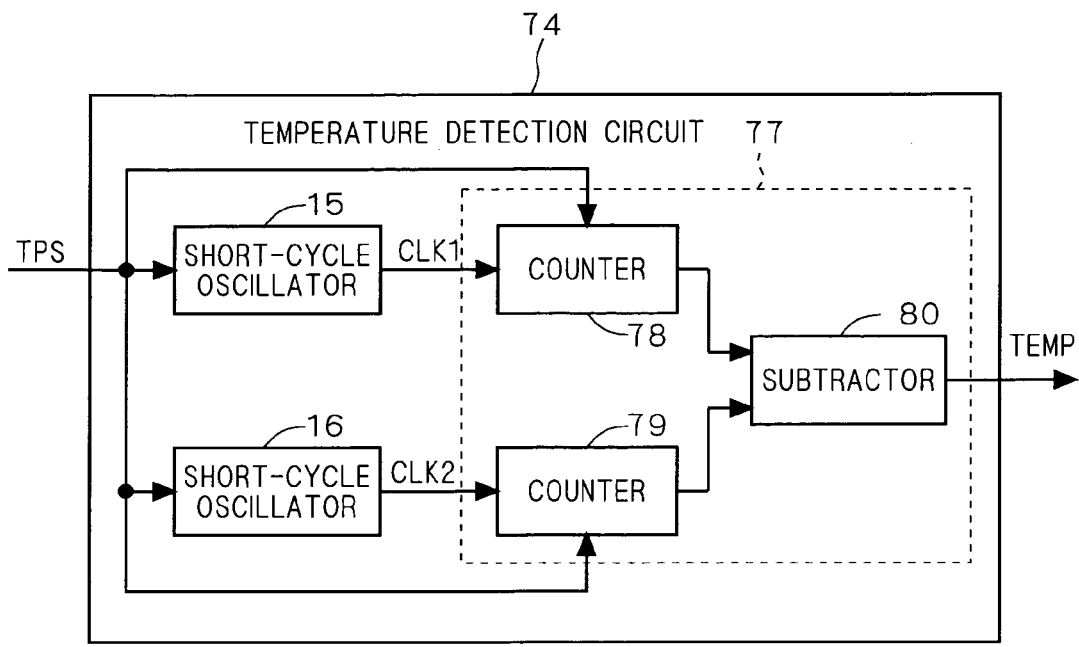
FIG. 13 is a block diagram showing a constitution of a temperature detection circuit according to a second embodiment of the present invention.

FIG. 13 is a block diagram showing a constitution of a temperature detection circuit 74 according to a second embodiment of the present invention. The temperature detection circuit 74 according to the second embodiment is used instead of the temperature detection circuit 14 in the semiconductor device according to the first embodiment.

As shown in FIG. 13, the temperature detection circuit 74 includes the above-described short-cycle oscillators 15 and 16 and a temperature signal generation circuit 77. The temperature signal generation circuit 77 includes counters 78 and 79 and a subtractor 80, and generates a temperature signal TEMP which is varied according to a temperature T of the semiconductor device of the present invention based on the clock signals CLK1 and CLK2. and outputs it.

The counter 78 counts the number of pulses of the clock signal CLK1 while a timing pulse signal TPS is activated and outputs the counted number N to the subtractor 80. The counter 79 counts the number of pulses of the clock signal CLK2 while the timing pulse signal TPS is activated and outputs the counted number M to the subtractor 80. The subtractor 80 subtracts the counted number M outputted from the counter 79 from the counted number N outputted from the counter 78 and outputs a signal showing its result as the temperature signal TEMP.

Figure 14:
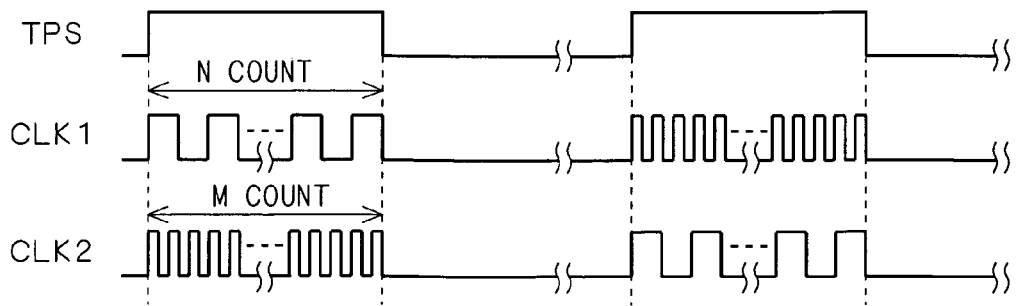
FIG. 14 is a timing chart showing an operation of the temperature detection circuit according to the second embodiment of the present invention.

FIG. 14 is a timing chart showing an operation of the temperature detection circuit 74 according to the second embodiment. As shown in FIG. 14, when the timing pulse signal TPS rises, the short-cycle oscillators 15 and 16 and the counters 78 and 79 are activated. Then, the short-cycle oscillators 15 and 16 oscillate and outputs the clock signals CLK1 and CLK2, respectively, and the counter 78 starts to count the number of pulses of the clock signal CLK1 and the counter 79 starts to count the number of pulses of the clock signal CLK2. Then, when the timing pulse signal TPS falls, the short-cycle oscillators 15 and 16 stop their operations and the counted numbers at that time are outputted to the subtractor 80. Then, when the timing pulse signal TPS rises again, the same operation as the above is repeated.

Thus, according to the temperature detection circuit 74 of the second embodiment, the number of pulses of each of the clock signals CLK1 and CLK2 is counted for a predetermined period and the difference between the counted numbers N and M is outputted as the temperature signal TEMP. Therefore, it is necessary for the temperature signal TEMP to express a positive or negative value. Thus, the temperature signal TEMP includes a plurality of bits of data and its most significant bit is used as a sign showing a positive or negative value and the other bits are used as signs showing an absolute value of the difference between the counted numbers N and M.

For example, when the most significant bit is "0", it means a positive value and when it is "1", it means a negative value. In this case, when the most significant bit is "0" and at least another bit is "1" in the temperature signal TEMP, it means that the counted number N is greater than the counted number M, and the frequency f1 of the clock signal CLK1 is higher than the frequency f2 of the clock signal CLK2.

Meanwhile, when the most significant bit is "1" and at least another bit is "1" in the temperature signal TEMP, it means that the counted number N is smaller than the counted number M, and the frequency f1 of the clock signal CLK1 is lower than the frequency f2 of the clock signal CLK2. Thus, referring to the graph shown in FIG. 4, when the most significant bit is "0" and at least another bit is "1" in the temperature signal TEMP, it means that the temperature T is higher than the room temperature T0 and when the most significant bit is "1" and at least another bit is "1" in the temperature signal TEMP, it means that the temperature is lower than the room temperature T0. In addition, regarding the bits other than the most significant bit in the temperature signal TEMP, as its value becomes greater, the difference between the temperature T and the room temperature T0 becomes big. Therefore, the present temperature T can be found by previously finding the relation between the difference between the counted numbers N and M, and the temperature T through simulation and the like and referring to the temperature signal TEMP.

As described above, according to the temperature detection circuit 74 in the second embodiment, similar to the temperature detection circuit 14, the temperature signal TEMP which is varied according to the temperature T of the semiconductor device of the present invention is generated based on the clock signal CLK1 having the positive temperature characteristics with respect to the frequency and the clock signal CLK2 having the negative temperature characteristics with respect to the frequency. According to the second embodiment, when the temperature T is varied, the frequencies of the clock signals CLK1 and CLK2 are varied in the opposite directions to each other, so that the counted numbers N and M are also varied in the different directions. Therefore, the temperature signal TEMP according to the second embodiment is also sensitively varied with respect to the temperature T. As a result, the temperature detection precision is improved.

In addition, when the temperature detection circuit 74 in the second embodiment is incorporated in the semiconductor device instead of the temperature detection circuit 14, the electrical characteristics of the circuit to be adjusted such as the inner power supply circuit 30 or 50 can be adjusted with respect to the temperature T with high precision. As a result, an erroneous operation of the semiconductor device of the present invention can be surely prevented.

In addition, according to the temperature detection circuit 14 according to the first embodiment, unlike the temperature detection circuit 74 according to the second embodiment, since it is not necessary to perform the subtracting operation and not necessary to provide the subtractor 80, the circuit size of the temperature detection circuit 14 can be reduced as compared with the temperature detection circuit 74.

Third Embodiment

Although the inner power supply circuits 30 and 50 are provided as the circuits whose characteristics are adjusted by the tuning circuit 20 in the first embodiment, the characteristics of the circuit other than the inner power supply circuits 30 and 50 can be adjusted by using the temperature signal TEMP of the present invention. According to a third embodiment, an example of the circuit other than the circuit to be adjusted will be described.

FIG. 15 is a block diagram showing a constitution of a timing generation circuit 90 whose electrical characteristics can be adjusted according to the temperature T by the above temperature detection circuit 10 and the tuning circuit 20. In an asynchronous circuit such as a DRAM, a plurality of timing pulse signals having different rising timings from each other are needed in general. The timing generation circuit 90 generates a plurality of timing pulse signals TPS1 to TPS5 to be supplied to the asynchronous circuit. For example, the timing pulse signals TPS1 to TPS5 are supplied to the memory circuit 40 comprising the DRAM. In addition, the timing generation circuit 90 is formed on the semiconductor substrate 1 together with the temperature detection circuit 10.

As shown in FIG. 15, the timing generation circuit 90 includes m ($\geq 2$) stages of delay circuits DC1 to DCm and a selection circuit 91. The first stage of delay circuit DC1 delays a reference timing pulse signal RTPS generating at predetermined intervals for a predetermined period and outputs it to the next stage of delay circuit DC2 and to the selection circuit 91. Each of the delay circuits DC2 to DCm delays the signal of the previous stage of circuit for a predetermined period and outputs it to the next stage of circuit and also to the selection circuit 91. The selection circuit 91 selects any five delay signals from the delay signals DS1 to DSm outputted from the delay circuits DC1 to DCm, based on an adjustment signal TNS outputted from the tuning circuit 20 and outputs them as the timing pulse signals TPS1 to TPS5, respectively. Therefore, the five timing pulse signals TPS1 to TPS5 have different rising timings from each other.

The selection circuit 91 determines five signals to be outputted from the m delay signals DS1 to DSm according to the tuning code shown in the inputted adjustment signal TNS. For example, when the adjustment signal TNS shows the tuning code CC1, the delay signals DS1 to DS5 are outputted as the timing pulse signals TPS1 to TPS5, and when the adjustment signal TNS shows the tuning code CC2, the delay signals DS2 to DS6 are outputted as the timing pulse signals TPS1 to TPS5, and when the adjustment signal TNS shows the tuning code CC3, the delay signals DS3 to DS7 are outputted as the timing pulse signals TPS1 to TPS5. Thus, the timing pulse signals TPS1 to TPS5 corresponding to the temperature T can be supplied to the asynchronous circuit such as the DRAM. Therefore, the asynchronous circuit can execute a predetermined function without erroneous operation by operating based on the timing pulse signals TPS1 to TPS5 appropriately adjusted according to the temperature T even when its operation timing is varied with the temperature T.

Fourth Embodiment

Although the timing generation circuit 90 is provided as the circuit to be adjusted in the third embodiment, characteristics of a circuit other than the timing generation circuit 90 can be adjusted according to the temperature T. Hereinafter, such circuit example will be described.

FIG. 16 is a block diagram showing a constitution of a clock signal generation circuit 95 which generates a reference clock signal RCLK which is used in measuring a refresh time in a DRAM. The electrical characteristics of the clock signal generation circuit 95 shown in FIG. 16 can be adjusted according to the temperature T using the temperature detection unit 10 and the tuning circuit 20. In addition, the clock signal generation circuit 95 is provided in the memory circuit 40 configured by the DRAM.

As shown in FIG. 16, the clock signal generation circuit 95 includes a bias voltage generation circuit 96 and plural stages of inversion circuits 151. In the inversion circuits 151 except for the last stage of inversion circuit 151, a connection point of a drain of a PMOS transistor 151a and a drain of an NMOS transistor 151b is connected to a connection point between a gate of a PMOS transistor 151a and a gate of an NMOS transistor 151b of the next stage of inversion circuit 151. In the last stage of inversion circuit 151, a signal at a connection point between a drain of a PMOS transistor 151a and a drain of an NMOS transistor 151b is outputted as the reference clock signal RCLK and that connection point is connected to a connection point between a gate of a PMOS transistor 151a and a gate of an NMOS transistor 151b of the first stage of inversion circuit 151. The reference clock signal RCLK is inputted to a timer (not shown) in the memory circuit 40 which measures the refresh time of the DRAM and the timer measures the refresh time by counting the number of pulses of the reference clock signal RCLK to a predetermined number.

The bias voltage generation circuit 96 generates a bias voltage BV which is inputted to each of the gates of the NMOS transistors 151c of the plural stages of inversion circuits 151. The bias voltage generation circuit 96 can vary the value of the bias BV into n kinds of values and the n kinds of voltage values correspond to the n tuning codes CC1 to CCn one on one. The bias voltage generation circuit 96 outputs the bias voltage BV showing the voltage value corresponding to the tuning code shown in the inputted adjustment signal TNS.

According to the above circuit constitution, the gate voltage of the NMOS transistor 151c in the inversion circuit 151 is varied with the temperature T, so that the frequency of the reference clock signal RCLK is also varied according to the temperature T. Therefore, the refresh time of the DRAM measured by the timer which is operated by receiving the reference clock signal RCLK is also varied with the temperature T. Thus, the refresh time is appropriately adjusted with the temperature T.

Fifth Embodiment

Figure 17:
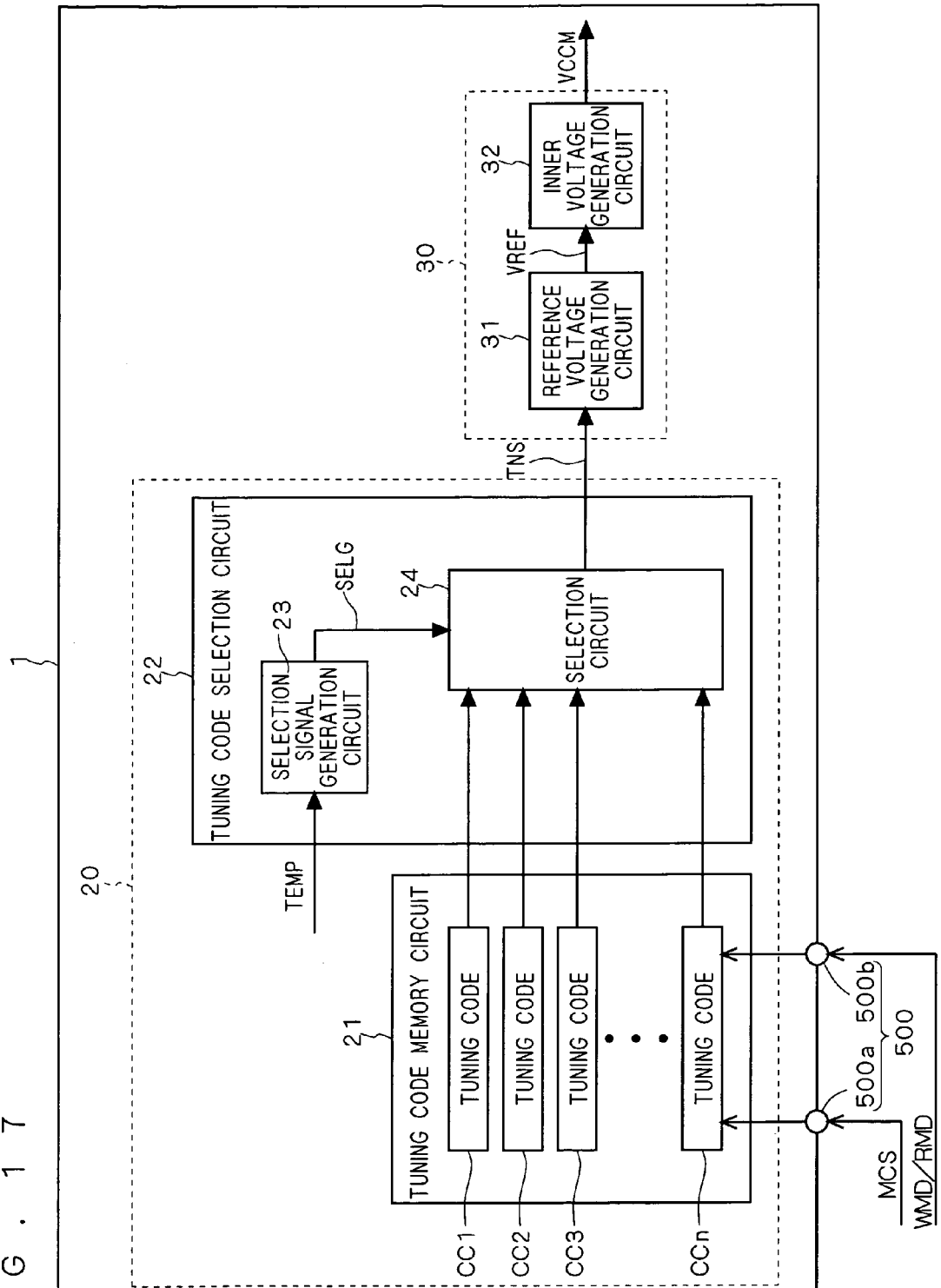
FIG. 17 is a block diagram showing constitutions of a tuning circuit and an inner power supply circuit according to a fifth embodiment of the present invention.

FIG. 17 is a block diagram showing constitutions of a tuning circuit 20 and an inner power supply circuit 30 in a semiconductor device according to a fifth embodiment of the present invention. According to the semiconductor device in the fifth embodiment, an external terminal 500 is provided on the semiconductor substrate 1 in the semiconductor device according to the first embodiment. Although memory information of the tuning code memory circuit 21 is capable of being rewritten by the CPU (not shown) provided on the semiconductor substrate 1 in the semiconductor device in the first embodiment, memory information of a tuning code memory circuit 21 is capable of being rewritten from the outside of the semiconductor substrate 1 using the external terminal 500 in the semiconductor device according to the fifth embodiment.

The external terminal 500 includes a control signal input terminal 500a and a data input/output terminal 500b. An external lead terminal (not shown) is provided in the resin package 100 in which the semiconductor substrate 1 is housed. The external lead terminal is partially exposed from the resin package 100. The external terminal 500 is electrically connected to the external lead terminal. A control signal MCS which controls an operation of the tuning code memory circuit 21 is inputted from the outside of the resin package 100 to the control signal input terminal 500a. The control signal MCS includes a readout activation signal which activates the tuning code memory circuit 21 when data is read out from the tuning code memory circuit 21, a write activation signal which activates the tuning code memory circuit 21 when data is written in the tuning code memory circuit 21, an address signal which designates a region to be accessed in memory regions of the tuning code memory circuit 21 and the like. Data WMD to be written in the tuning code memory circuit 21 is inputted to the data input/output terminal 500b and data RMD read from the tuning code memory circuit 21 is outputted to the outside of the resin package 100 through the data input/output terminal 500b.

Figure 18:
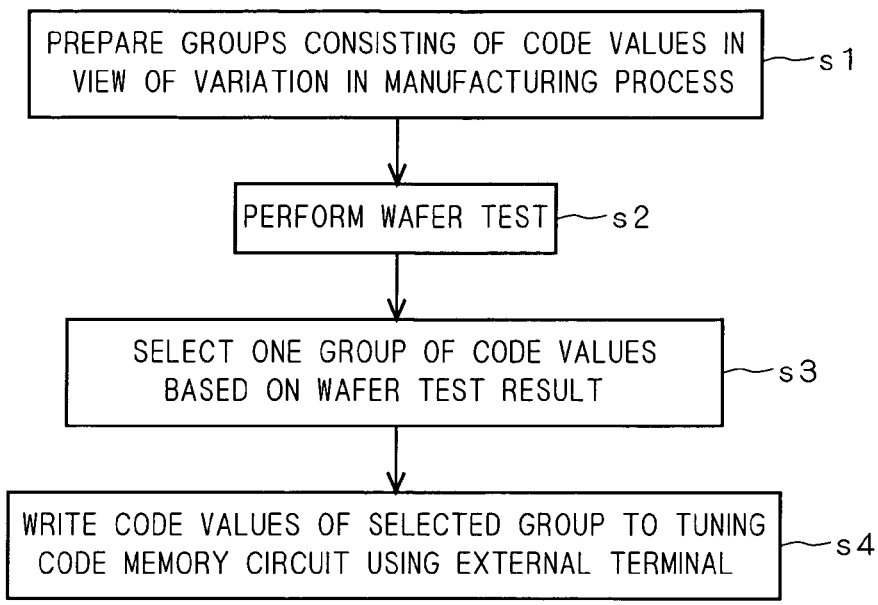
FIG. 18 is a flowchart showing a method of setting tuning codes according to the fifth embodiment of the present invention.

Next, a method of setting the tuning code CC1 to CCn using the external terminal 500 will be described. FIG. 18 is a flowchart showing the tuning code setting method. According to the fifth embodiment, a wafer of the semiconductor substrate 1 is tested before it is housed in the resin package 100, and the tuning code CC1 to CCn are set in the tuning code memory circuit 21 based on the result of the test.

As shown in FIG. 18, in step s1, a plurality of groups each including n code values of the tuning codes CC1 to CCn to be stored in the tuning code memory circuit 21 are previously prepared in view of a variation in manufacturing process and the plurality of groups are stored in a tester which performs the wafer test. In general, temperature characteristics of the circuit to be adjusted such as the inner power supply circuit 30 are varied among wafers because of the variation in manufacturing process. Therefore, when the code values of the tuning codes CC1 to CCn are the same among wafers, the electrical characteristics of the circuit to be adjusted could not be sufficiently adjusted using the temperature signal TEMP. Then, in view of the variation in manufacturing process, the groups of the code values of the tuning codes CC1 to CCn are previously prepared and the group of the code values according to the actual temperature characteristics of the circuit to be adjusted is selected from those to be used.

Figure 19:
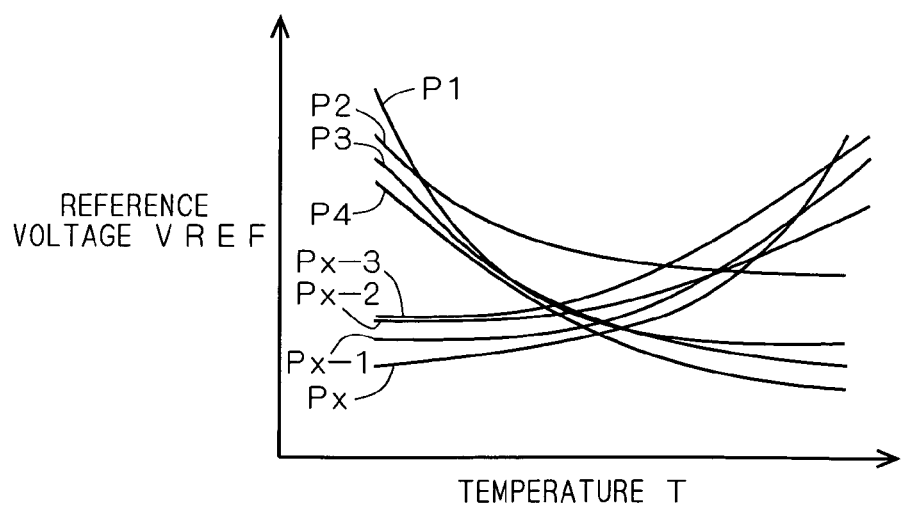
FIG. 19 is a graph showing that temperature characteristics of a reference voltage generation circuit are varied due to a variation in manufacturing process.
Figures 20, 21:
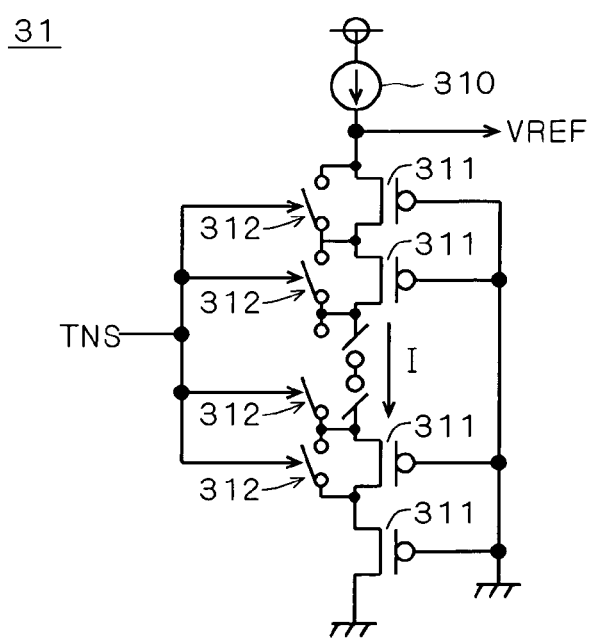
FIG. 20 is a view showing code values of the tuning codes to be prepared in view of the variation in manufacturing process.
FIG. 21 is a circuit diagram showing a constitution of a reference voltage generation circuit according to a sixth embodiment of the present invention.

FIG. 19 is a graph showing that temperature characteristics of the reference voltage generation circuit 31 are varied due to the variation in manufacturing process. The horizontal and vertical axes designate a temperature T and a reference voltage VREF, respectively in FIG. 19. As shown in FIG. 19, the temperature characteristics of the reference voltage generation circuit 31 with respect to the reference voltage VREF are varied due to the variation in manufacturing process, and they range from P1 to Px (x≧2), for example. According to the fifth embodiment, as shown in FIG. 20, groups of the code values corresponding to the characteristics P1 to Px are prepared. In FIG. 20, n code values of the tuning codes CC1 to CCn corresponding to the characteristics Pl (l is variable and 1≦l≦x) are set to the code values CV1-l to CVn-l, respectively. In addition, the graph shown in FIG. 19 can be obtained from a simulation result or an actual measured result.

Referring to FIG. 18, the wafer of the semiconductor substrate 1 on which the temperature detection unit 10, the tuning circuit 20 and the like are formed is tested using a tester in step s2. Then, one group is selected from the groups of the code values prepared in step s1 in the tester according to the result of the wafer test in step s3. For example, in step s1, regarding a specific element such as an MOS transistor formed on the semiconductor substrate 1, a corresponding relation between electrical characteristics of the specific element and characteristics P1 to Px in the reference voltage generation circuit 31 is obtained, and based on the corresponding relation and a corresponding relation between the characteristics P1 to Px and the code values shown in FIG. 20, a table showing a corresponding relation between the electrical characteristics of the specific element and the group including the code values is formed and it is stored in the tester. Then, the electrical characteristics of the specific element is measured at the time of the wafer test in step s2, and the group of the code values corresponding to the measured result is selected form the above table in step s3.

Then, in step s4, the tester inputs the write activation signal and the address signal to the control signal input terminal 500a of the external terminal 500 and inputs the plurality of code values in the selected group to the data input/output terminal 500b thereof, and writes the code values in the tuning code memory circuit 21. The reference voltage generation circuit 31 is controlled using that tuning codes CC1 to CCn, so that the reference voltage VREF can be appropriately controlled according to the temperature T without being affected by the variation in manufacturing process.

As described above, according to the semiconductor device in the fifth embodiment, since the plurality of tuning codes CC1 to CCn to adjust the electrical characteristics of the circuit to be adjusted are stored in the tuning code memory circuit 21 in which the memory information is capable of being rewritten, the tuning codes CC1 to CCn is capable of being rewritten. Thus, even when the electrical characteristics of the circuit to be adjusted are varied due to the variation in manufacturing process, the values of the tuning codes CC1 to CCn are capable of being appropriately rewritten according to the variation. Thus, the electrical characteristics of the circuit to be adjusted are capable of being appropriately adjusted based on the temperature detection result without being affected by the variation in manufacturing process.

In addition, according to the fifth embodiment, since the external terminal 500 to rewrite the memory information of the tuning code memory circuit 21 from the outside of the semiconductor substrate 1 is provided, the tuning codes CC1 to CCn are capable of being directly rewritten without using a circuit such as the CPU on the semiconductor substrate 1. For example, the tuning codes CC1 to CCn can be rewritten by a device provided outside the resin package 100 or when another semiconductor substrate different from the semiconductor substrate 1 is provided in the resin package 100, the tuning codes CC1 to CCn can be rewritten by a circuit formed on the other semiconductor substrate. Furthermore, on the wafer of the semiconductor substrate 1 before housed in the resin package 100, the tuning codes CC1 to CCn are capable of being rewritten by the tester which performs the wafer test.

Sixth Embodiment

FIG. 21 is a circuit diagram showing a constitution of a reference voltage generation circuit 31 according to a sixth embodiment. According to the sixth embodiment, one example of a circuit constitution of the reference voltage generation circuit 31 will be described.

As shown in FIG. 21, the reference voltage generation circuit 31 includes a constant current circuit 310 and n PMOS transistors 311 and (n-1) switch circuits 312. A gate of the PMOS transistor 311 is connected to the ground voltage and each of the PMOS transistors 311 serves as a resistor element. Thus, the plurality of PMOS transistors 311 are connected in series with each other and a source terminal of the PMOS transistor 311 at one end is connected to the constant current circuit 310 and a drain terminal of the PMOS transistor 311 at the other end is connected to the ground voltage.

The (n-1) switch circuits 312 are provided so as to correspond to the (n-1) PMOS transistors 311 one on one except for the PMOS transistor 311 whose drain terminal is grounded, and each switch circuit 312 is connected to the corresponding PMOS transistor 311 in parallel. Thus, the switch circuit 312 is turned on or off by an adjustment signal TNS individually.

According to the reference voltage generation circuit 31 having the above constitution, a constant current I flows from the source terminal of the PMOS transistor 311 connected to the constant current circuit 310 to the drain terminal of the PMOS transistor 311 connected to the ground voltage. Thus, a voltage which is in proportion to a resistance value of a path in which the constant current I flows is generated at the source terminal of the PMOS transistor 311 connected to the constant current circuit 310, and this voltage is outputted as a reference voltage VREF.

In the reference voltage generation circuit 31, the number of the switch circuits 312 which are turned on according to the value of the adjustment signal TNS is varied. As a result, the resistance value of the path in which the constant current I flows is varied in n stages. Thus, the voltage value of the reference voltage VREF is also varied in n stages.

As described above, according to the reference voltage generation circuit 31 in the sixth embodiment, since the resistance value of the path in which the constant current I flows can be varied by the number of the switch circuits 312, the value of the reference voltage VREF can be simply and finely controlled. When the reference voltage generation circuit 31 is provided in the inner power supply circuit 30, the reference voltage VREF can be varied according to a temperature signal TEMP. As a result, the value of the inner power supply voltage VCCM can be appropriately adjusted according to the temperature T of the semiconductor device of the present invention.

In addition, although the tuning codes CC1 to CCn are stored in the memory circuit in which the memory information can be rewritten in the above embodiment, when it is not necessary to change the set tuning codes CC1 to CCn, the tuning codes CC1 to CCn may be stored in a memory circuit in which memory information cannot be rewritten like a mask ROM.

In addition, although the inner power supply circuits 30 and 50 are step-down power supply circuits in the above embodiment, they may be step-up power supply circuits. Furthermore, although both memory circuit 40 and logic circuit 60 are formed on the semiconductor substrate 1 in the above embodiment, only either one may be formed on the semiconductor substrate 1. In this case, either one of the inner power supply circuit 30 or 50 is to be formed on the semiconductor substrate 1.

While the invention has been shown and described in detail, the foregoing description is in all aspects illustrative and not restrictive. It is therefore understood that numerous modifications and variations can be devised without departing from the scope of the invention.

What is claimed is:

1. A semiconductor device comprising:
a first oscillator generating a first clock signal having positive temperature characteristics with respect to a frequency;
a second oscillator generating a second clock signal having negative temperature characteristics with respect to a frequency; and
a temperature signal generation unit generating a temperature signal which is varied according to a temperature of said semiconductor device based on said first and second clock signals, said temperature signal generation unit including:
 a first counter counting the number of pulses of said first clock signal to a predetermined number and outputting a signal activated while the number is counted; and
 a second counter counting the number of pulses of said second clock signal while said signal outputted from said first counter is activated and outputting a signal showing the counted number as said temperature signal.

2. A semiconductor device comprising:

a first oscillator generating a first clock signal having positive temperature characteristics with respect to a frequency;

a second oscillator generating a second clock signal having negative temperature characteristics with respect to a frequency; and a temperature signal generation unit generating a temperature signal which is varied according to a temperature of said semiconductor device based on said first and second clock signals, said temperature signal generation unit including:

a first counter counting the number of pulses of said first clock signal for a predetermined time and outputting the counted number;

a second counter counting the number of pulses of said second clock signal for said predetermined time and outputting the counted number; and a subtractor finding a difference between the counted number outputted from said first counter and the counted number outputted from said second counter and outputting a signal showing the result as said temperature signal.

3. A semiconductor device comprising:

a first oscillator generating a first clock signal having positive temperature characteristics with respect to a frequency;

a second oscillator generating a second clock signal having negative temperature characteristics with respect to a frequency;

a temperature signal generation unit generating a temperature signal which is varied according to a temperature of said semiconductor device based on said first and second clock signals; and a control circuit sequentially generating a plurality of pulse signals and outputting them to a temperature detection circuit which includes said first and second oscillator and said temperature signal generation unit, wherein said control circuit is capable of controlling generation intervals of said pulse signals, and said temperature detection circuit generates said temperature signal every time said pulse signal is inputted.

4. A semiconductor device comprising:

a first oscillator generating a first clock signal having positive temperature characteristics with respect to a frequency;

a second oscillator generating a second clock signal having negative temperature characteristics with respect to a frequency;

a temperature signal generation unit generating a temperature signal which is varied according to a temperature of said semiconductor device based on said first and second clock signals;

an object circuit whose electrical characteristics are adjusted; and a tuning circuit adjusting said electrical characteristics of said object circuit based on said temperature signal, said tuning circuit including:

a memory circuit storing a plurality of tuning codes for adjusting said electrical characteristics of said object circuit, in which memory information is capable of being rewritten; and a tuning code selection circuit selecting one of said tuning codes based on said temperature signal generated in said temperature signal generation unit and outputting it to said object circuit.

* * * * *